(12) United States Patent
McKiel, Jr.

(10) Patent No.: US 8,897,626 B2
(45) Date of Patent: Nov. 25, 2014

(54) NON-LINEAR REWIND OF VIDEO PROGRAMS

(75) Inventor: Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1081 days.

(21) Appl. No.: 12/827,276

(22) Filed: Jun. 30, 2010

(65) Prior Publication Data

US 2012/0002953 A1    Jan. 5, 2012

(51) Int. Cl.
*H04N 5/783*    (2006.01)
*H04N 21/472*    (2011.01)
*H04N 21/4402*    (2011.01)

(52) U.S. Cl.
CPC .............. *H04N 5/783* (2013.01); *H04N 21/472* (2013.01); *H04N 21/440263* (2013.01)
USPC ........................................... 386/345; 386/347

(58) Field of Classification Search
USPC ..................... 386/345, 347, E5.003
See application file for complete search history.

(56) References Cited

U.S. PATENT DOCUMENTS

2005/0257152 A1*  11/2005  Shimizu et al. ............... 715/723
2009/0063981 A1*  3/2009  Kikuchi et al. ............... 715/723
2009/0172543 A1*  7/2009  Cronin et al. .................. 715/721

OTHER PUBLICATIONS www.gridsearch.tv, "GridSearch Fast Forward for the VOD generation", Press Pack, Jun. 30, 2010 (Print Date), 4 pages.

* cited by examiner

*Primary Examiner* — Thai Tran
*Assistant Examiner* — Girumsew Wendmagegn

(57) ABSTRACT

A rewind or fast forward operation may be performed in which a series of reduced-in-size images from previous frames in a video program may be presented to the viewer. In one implementation, a device may obtain sampled images corresponding to select frames of the video program and output a series of the sampled images in an order in which a sampling time corresponding to each of the sampled images in the video program monotonically increases or decreases in the output series. Differences in the sample times between successive images in the series of sampled images may not be uniform. The device may receive a selection of one of the images in the output series of sampled images and change a current output location of the video program to a location corresponding to the sampling time of the selected image.

16 Claims, 10 Drawing Sheets

NON-LINEAR REWIND OF VIDEO PROGRAMS

BACKGROUND

Recently, consumers of video content have benefited from a variety of technologies that improve the recording and viewing of video streams. Digital video recorders (DVRs) allow for the recording and playing back of video. Many DVRs also allow a user to concurrently store a video program as it is being broadcast while playing back a previously recorded program to the user. DVRs may also provide for so called "trick play" features, such as being able to pause and rewind a television broadcast in progress.

Whether a given video program is being watched as it is being broadcast or played back well after the program has been recorded, DVRs generally allow a viewer to rewind the program to replay a previous portion of the program. That is, relative to the current playback point in the program, the user may request that the DVR seek an earlier point in the program and begin playback starting at the earlier point.

While rewinding, the DVR will typically show images representing the current point in the rewind so that the user can visually seek to a point in the program. Some DVRs allow the user to choose the rate of the rewind operation. For example, a user that wants to rewind to a scene that was shown a relatively short period ago may rewind using the "normal" rewind rate. However, if the user desires to rewind to a location closer to the beginning of the program, the user may rewind using the "double" or "triple" rewind rates, if available. In either of these cases, however, the rewind operation provided by the DVR may be performed linearly such that a point further back in the broadcast takes proportionally longer to rewind to that point.

DETAILED DESCRIPTION

The following detailed description refers to the accompanying drawings. The same reference numbers in different drawings may identify the same or similar elements. Also, the following detailed description does not limit the invention.

Implementations described herein relate to a rewind (or fast forward) operation in which a series of reduced-in-size images ("rewind images" or "rewind frames") from previous frames in the program may be shown to the user. The user may select one of the rewind images to start playback from the location corresponding to the rewind image. Time differences between the series of rewind images may vary such that the "older" rewind images may be spaced farther apart (in time) from one another.

Figure 1:
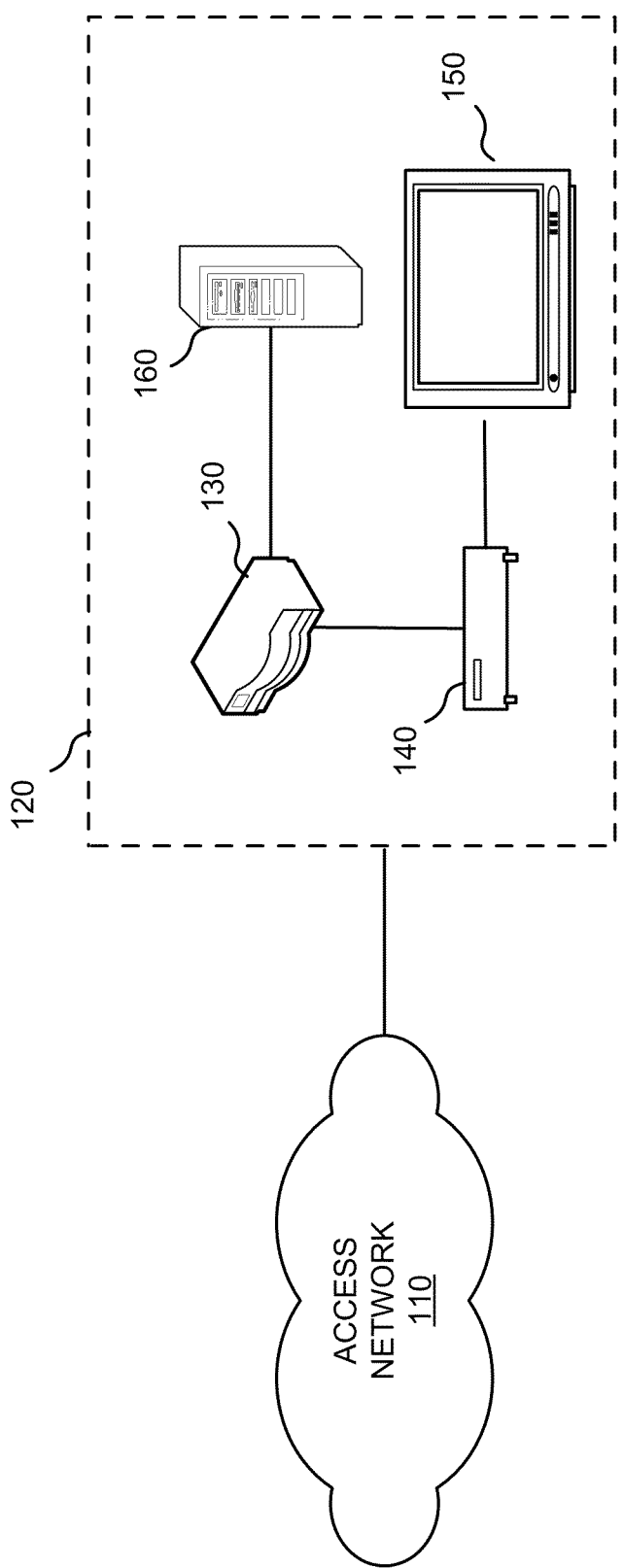
FIG. 1 is a diagram of an example system.

FIG. 1 is a diagram of an example system 100 in which systems and/or methods described herein may be implemented. As illustrated, system 100 may include an access network 110 that provides telecommunication services, such as television programming, to customer premises 120. Access network 110 may include, for example, a network that delivers information over fiber optic cables, coaxial cables, or a network that delivers information over another form of wired or wireless connections. In one possible implementation, access network 110 may include an over-the-air broadcast network or a hybrid network, such as a hybrid fiber-coaxial network. Customer premises 120 may include one or more devices connected to access network 110. In the example shown in FIG. 1, customer premises 120 is connected to access network 110 through a wired connection, such as a fiber optic connection. As shown, customer premises 120 may include a gateway 130, a digital video recorder (DVR) 140, a video display device 150, and a computing device 160.

Gateway 130 may include a network device that provides an interface from access network 110 to DVR 140 and computing device 160. When telecommunication services are provided to customer premises 120 via an optical fiber, gateway 130 may include an optical network terminal (ONT) that connects to the optical fiber. The ONT may convert signals between DVR 140 and access network 110. Gateway 130 may also include an Ethernet output port that connects to computing device 160 or to a VoIP telephone. In some implementations, gateway 130 may be omitted or the functionality of gateway 130 integrated into DVR 140.

DVR 140 may include a device that generally operates to record video in a digital format to a computer memory, such as a disk drive, USB flash drive, or other memory medium. DVR 140 may be a stand-alone set-top box (STB), a portable media player (PMP) and recorder, or software on personal computers which enables video capture and playback to and from disk. In some implementations, DVR 140 may be implemented as an integrated part of video display device 150. In general, the operations of DVR 140, as described herein, may be performed on any device capable of buffering video.

DVR 140 may support a number of features related to the recording and playback of video programs. These features may include the ability to "rewind" or "fast forward" a video program that is currently being viewed. Rewinding a video program may include seeking an earlier location in the video program and "fast forwarding" may include seeking a later location in the video program. Consistent with aspects described herein, rewinding and fast forwarding may be performed by DVR 140 in a non-linear manner such that earlier portions of a program can be accessed quickly (i.e., earlier portions of the program do not take proportionately longer to seek).

Video display device 150 may include any device capable of receiving and reproducing video signals. In one implementation, video display device 150 may include a television. In another implementation, video display device 150 may include, for example, a display of a stationary communication device (e.g., a computer monitor or a telephone), or a display of a portable communication device (e.g., a mobile telephone or a personal digital assistant (PDA)).

Computing device 160 may include a personal computer or other computing device, such as, for example, a desktop computer, laptop computer, PDA, etc., used for general computing tasks.

FIG. 1 shows an example of components that may be included in system 100. In other implementations, system 100 may include fewer, different, differently arranged, or additional components than depicted in FIG. 1. Alternatively, or additionally, one or more components of system 100 may perform one or more tasks described as being performed by one or more other components of system 100.

Figure 2:
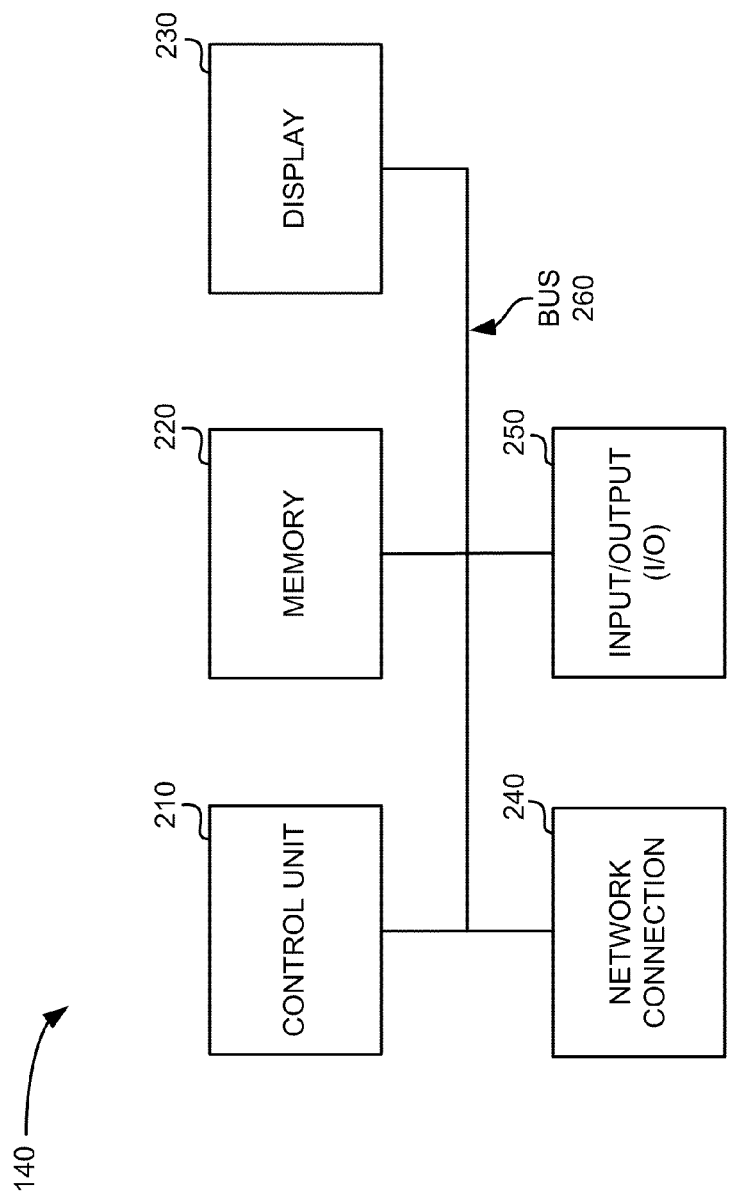
FIG. 2 is diagram illustrating example components of a DVR shown in FIG. 1.

FIG. 2 is a diagram illustrating exemplary components of DVR 140. As shown, DVR 140 may include a control unit 210, a memory 220, a display 230, a network connection 240, an input/output (I/O) component 250, and a bus 260.

Control unit 210 may include a processor, microprocessor, or another type of processing logic that interprets and executes instructions. Among other functions, control unit 210 may decode video received from access network 110 and provide an interface through which a user may interact with video programming, such as an interface for rewinding a program.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 230 may include any component capable of providing visual information. For example, in one implementation, display 230 may be a light emitting diode (LED) array or a liquid crystal display (LCD). Display 230 may display, for example, text (such as a time, a date or a channel selection), image, and/or video information. Network connection 240 may include any transceiver-like mechanism that enables DVR 140 to communicate with other devices and/or systems. For example, network connection 240 may include an Ethernet interface, an optical interface, a coaxial interface, a radio interface, or the like. Network connection 240 may allow for wired and/or wireless communication. Network connection 240 may be configured to connect DVR 140 to access network 110.

Input/output devices 250 may generally include user input devices such as external buttons, and output devices, such as LED indicators. With input/output devices 250, a user may generally interact with DVR 140. In some implementations, input/output devices 250 may be implemented via a remote control. A remote control may include a range of devices that provide, for example, function-specific keys, number keys, and/or a full-text keypad. Bus 260 may provide an interface through which components of DVR 140 can communicate with one another.

As will be described in detail below, DVR 140 may perform certain operations relating to rewinding or fast-forwarding video content. DVR 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of DVR 140, in other implementations, DVR 140 may include fewer, additional, different and/or differently arranged components than those depicted in FIG. 2. Alternatively, or additionally, one or more components of DVR 140 may perform one or more other tasks described as being performed by one or more other components of DVR 140.

In the description that follows, operations of DVR 140 will be described to implement a non-linear rewind operation for video content. When watching stored video content, the operations may be similarly applied to implement a non-linear fast-forwarding of the video content. For simplicity, the "rewind operation" will be described below, although it can be appreciated that a fast forward operation could be similarly implemented in addition to or alternatively to the rewind operation.

Figure 3:
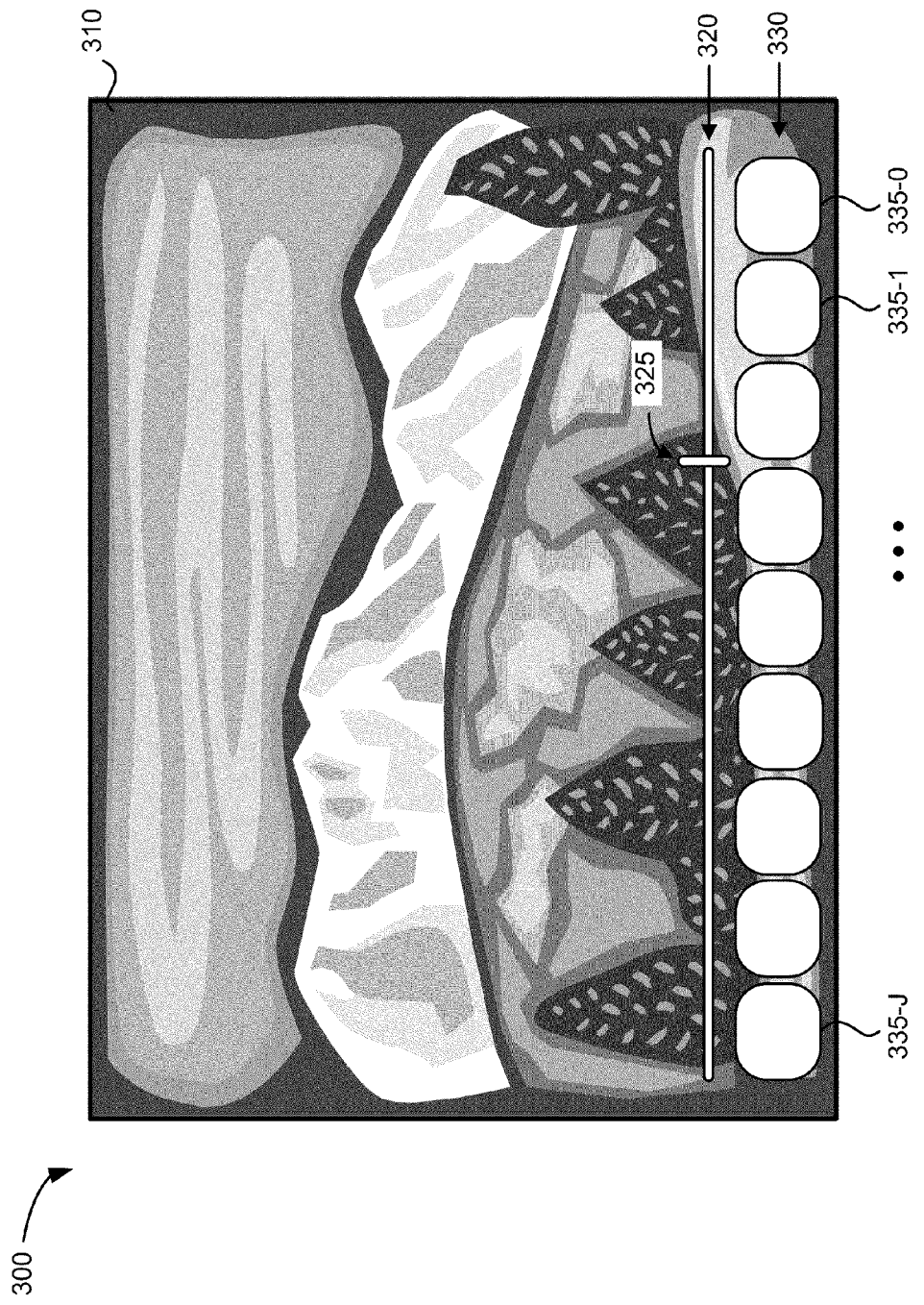
FIG. 3 is a diagram illustrating an example of an interface for performing a non-linear rewind operation.

FIG. 3 is a diagram illustrating an example of an interface 300 for performing a non-linear rewind operation. Interface 300 may be presented on video display device 150 by DVR 140. In an alternative implementation, portions of interface 300 relating to the rewind operation may be displayed on an adjunct display device, such as on a laptop, smart phone, a "pad" computing device, or another display. Interface 300 may be presented in response to a user selecting a rewind operation, pause operation, or other operations that customarily elicit a program time line while viewing video content. For example, the user may press a rewind button on a remote control to instruct DVR 140 to perform the rewind operation. As another example, instead of displaying interface 300 during an explicit rewind operation, interface 300 may be set to an "always on" mode in which interface 300 is persistently presented. Interface 300 may include a main display portion 310 that may present the video content that is being played. In some implementations, the video content may continue to be normally presented to the user during the rewind operation. In other implementations, DVR 140 may display a frame of the current rewind location of the video content in main display portion 310.

Interface 300 may further include a program position bar 320 and a rewind frame series 330. Program position bar 320 and rewind frame series 330 may be graphic user interface elements that are overlaid on main display portion 310 by DVR 140. Program position bar 320 may represent the video content as a bar in which the current playback location of the video content is graphically illustrated. In FIG. 3, the current playback location is indicated by a vertical line 325 on bar 320. In other words, in this example, the current playback location is approximately 75% through the entire video program. In situations in which the program is not fully available, such as when watching a real-time television broadcast, position bar 320 may represent the buffered portion of the program.

Figure 4:
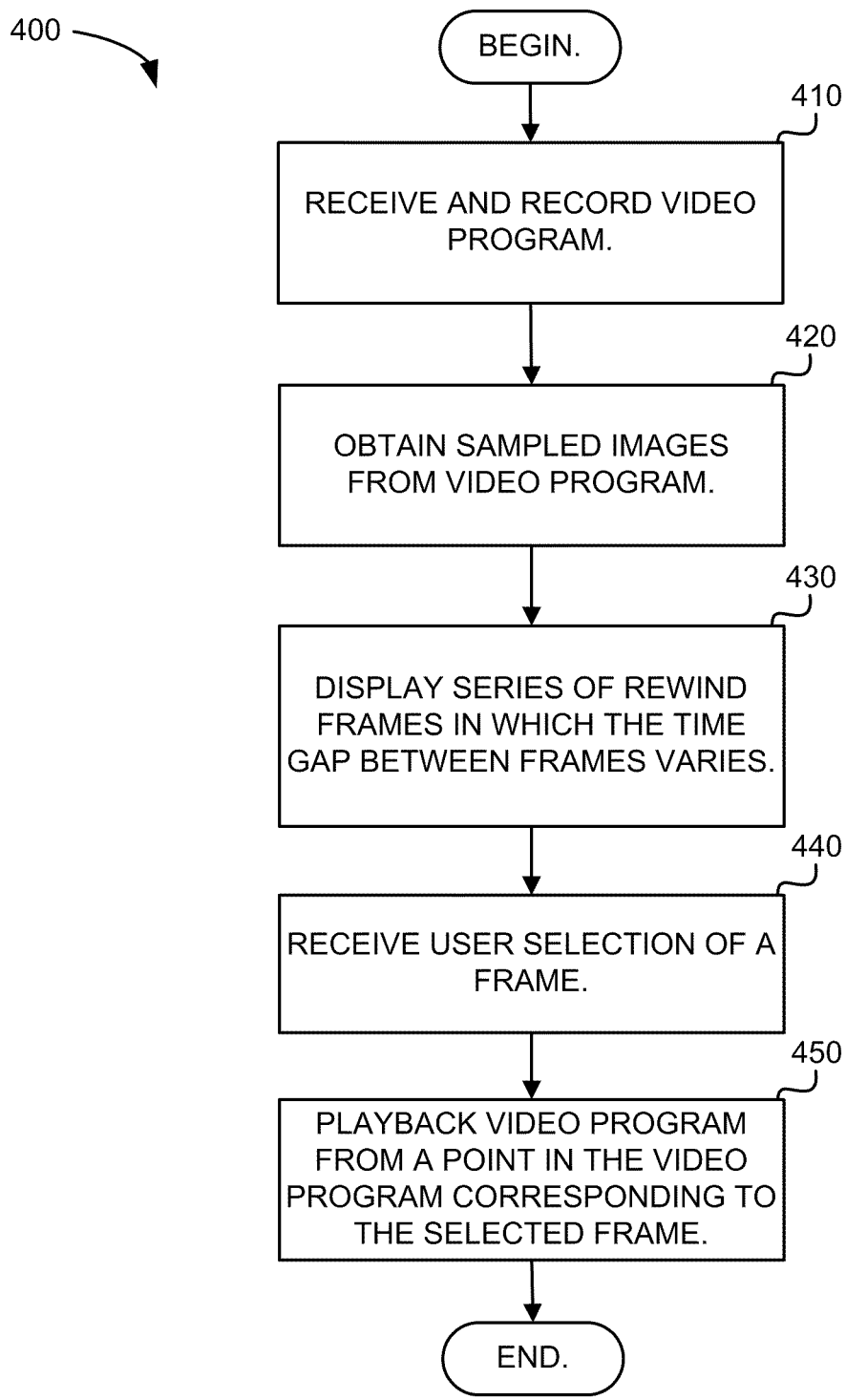
FIG. 4 is a flow chart illustrating an example of a process for implementing a rewind operation.

Rewind frame series 330 may represent a series of rewind frames, 335-0 through 335-J, where J is an integer, in the video content. Each of rewind frames 335 may be displayed at a reduced resolution and/or size (e.g., as a "thumbnail") version of a particular frame in the video program. Rewind frames 335 may be arranged such that the frame corresponding to the most recent or current playback location of the video program is on one end of the series of frames and a frame corresponding to an earliest point of the video program is on the other end of the series of frames. In FIG. 3, rewind frame 335-0 may present an image from the video content that represents a recent, such as an approximately ten second delayed version, of the video content and rewind frame 335-J may present an image from the video content that is at an earliest location, of the rewind frames 335, of the video program. Consistent with aspects described herein, the time differences between successive rewind frames 335 may be non-uniform. For example, in the example illustrated, in which J=8, rewind frame 335-0 may correspond to the current playback position or a location near the current playback position (e.g., time delay=10 s), rewind frame 335-1 may correspond to a frame delayed approximately 20 s, rewind frame 335-2 may correspond to a frame delayed approximately 30 s, rewind frame 335-5 may correspond to a frame delayed approximately 4 minutes, and rewind frame 335-8 may correspond to a frame delayed approximately 32 minutes. In other words, the sampling interval between frames may be non-uniform as the series of rewind frames 335 progresses from right to left. FIG. 4 is a flow chart illustrating an example of a process 400 for implementing a rewind operation. Process 400 may be performed, for example, by DVR 140.

Process 400 may include receiving and recording a video program (block 410). The received video program may be video content delivered over access network 110. The video content may be a video program that is currently being viewed by a user. DVR 140 may record the video program along with presenting the video content through video display device 150. Recording the video program may allow DVR 140 to offer features such as pausing a video program (i.e., stop displaying the video program but continue to record the video program and then resume displaying the video program when the user unpauses) and rewinding (or fast forwarding) the video program.

Process 400 may additionally include obtaining sampled images from the video program (block 420). Block 420 may include sampling the video program and saving the image corresponding to select video frames into a frame memory. For ease of display and efficient storage and manipulation, each of the sampled images may be a reduced resolution version of the original frame. The sampled images may be displayed as rewind frames 335. The sampling may be performed periodically, such as by sampling one frame of the video program every three seconds. Alternatively, another technique may be used to obtain images representing points in the video program. In another possible alternative, the sampled images may be received by DVR 140, such as images received as part of an adjunct video stream corresponding to the video program.

Process 400 may additionally include displaying a series of rewind frames 335 to the user (block 430). In one implementation, the series of rewind frames may be displayed next to one another in a bottom or top portion of the display of video display device 150. The series of frames may be displayed such that one end of the series displays a recent image from the video content and each next frame in the series displays an image from farther back in the video program. In other words, the sample time (relative to the program location) of the frames in the series may monotonically increase or decrease. The time gap between each frame (i.e., difference in sampling times of the frames) in the series may vary. More particularly, the time gap may increase as the series progresses from the most recent frame to that farthest back in the video program (block 430). In one implementation, the time gap may increase non-uniformly. Interface 300 illustrates one example of a displayed series of frames, in which nine frames are displayed in the bottom portion of the screen of video display device 150.

The most recent rewind frame may correspond to a position in the video program slightly delayed from where the user is currently viewing the video program. The most recent rewind frame may be, for example, in a television broadcast, delayed approximately 10 seconds from the "live" position in the broadcast. For a pre-recorded video program, the most recent rewind frame may correspond to the location in the video program that is currently being viewed.

Process 400 may include receiving a frame selection from the user (block 440). The user may, for example, use a remote control to select one of the frames in the series of rewind frames. For example, the user may enter a number corresponding to the desired frame to select the desired frame. Other techniques for selecting a desired frame, such as using other keys (e.g., arrow keys) or other input devices may be used to select the desired frame. In general, the desired frame will correspond to a point in the video program to which the user would like to rewind.

Process 400 may further include playing back the video program from a point in the video program corresponding to the desired frame (block 450). The video program may thus be "rewound" to this point. In this manner, the user may be able to quickly and easily perform a rewind operation. Users may frequently desire to rewind a video program to a point relatively close to the current playback location of the video program, such as to replay a recent scene that the user either missed or did not fully understand. The rewind process described with respect to process 400 may facilitate this desire, as the series of rewind frames 335 is biased to include a greater representation of frames that are close to the current playback point. In some implementations, process 400 may be in conjunction with a traditional rewind/fast forward process. For example, a user may use process 400 to quickly rewind to a point 16 minutes prior to the current location and then use the traditional rewind operation to begin a linear search backwards from that point.

As an example of block 450, assume that a user selects rewind frame 335-J (FIG. 3), which displays an image from the video program that is approximately 32 minutes behind the current playback location. DVR 140 may cause the video program to seek 32 minutes backwards and to begin playback at that point.

It may be desirable, when sampling and storing the rewind frames to implement process 400, that the rewind frames are sampled and stored for presentation to the user in a manner that is memory and processor efficient. One technique for effectively implementing process 400 will next be described with reference to FIGS. 5-9.

Figure 5:
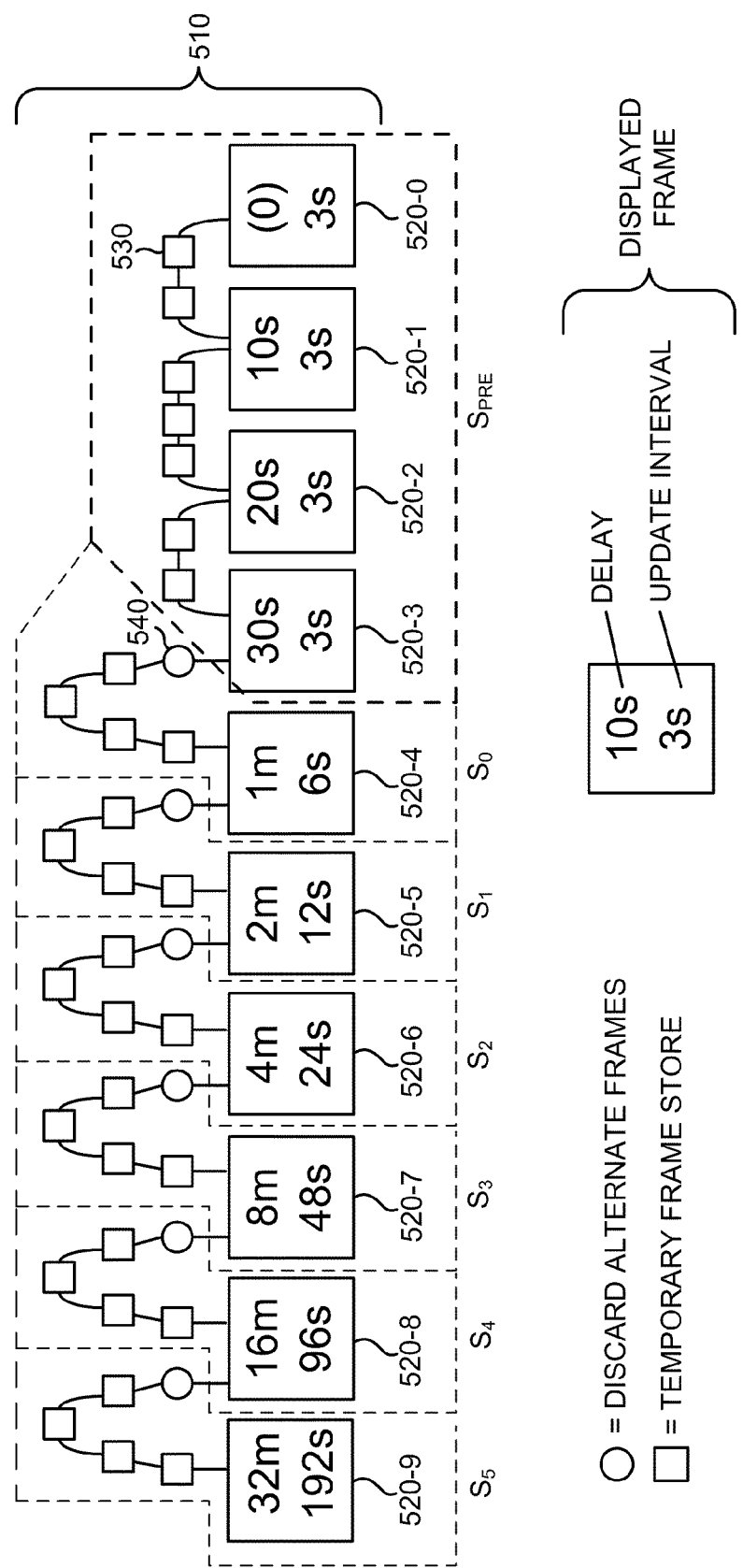
FIG. 5 is a diagram conceptually illustrating sampled frames that are used to display a series of sampled frames.

FIG. 5 is a diagram conceptually illustrating sampled frames that are used to display the series of sampled frames, such as rewind frames 335, at any particular instant. In FIG. 5, sampled frames 510 are illustrated as squares. The larger squares, squares 520-0 through 520-9, may represent active frames that are currently being displayed as rewind frames 335 on video display device 150. Smaller squares 530 may represent buffered frames that are being stored by DVR 140 but that are not being shown on video display device 150. Circles 540 may represent points at which alternate frames are discarded.

As illustrated, active frames 520 may each include a delay value (e.g., 10 s, 20 s, 30 s) and an update interval (e.g., 3 s, 12 s, 24 s). The delay value may indicate how long the frame is delayed relative to the current position of the video program. For example, active frame 520-1 is approximately ten seconds behind the current position of the video program and is updated every three seconds, active frame 520-2 is approximately 20 seconds behind the current position of the video program and is also updated every three seconds, and active frame 520-9 is approximately 32 minutes behind the current position of the video program and is updated every 192 seconds. Active frames corresponding to frames farther back from the current position may be updated less frequently than active frames closer to the current position. Additionally, by discarding frames (circles 540), the total number of stored frames at any particular point in time can be much less than if all the frames back to active frame 520-9 were buffered.

Active frame 520-0 may represent the initial sampling of the video program. Because active frame 520-0 corresponds to the current position of the video program (i.e., the frame of the video program being shown on video display device 150), the frame corresponding to active frame 520-0 may not be shown as part of rewind frames 335. Accordingly, the series of frames corresponding to rewind frames 335 (FIG. 3) may correspond to active frames 520-1 through 520-9.

Buffered frames 530 may represent frames that are not currently being displayed. At each update interval for an active frame 520, the frame in the updating active frame may shift into a buffer frame 530. Similarly, buffer frames 530 may shift into the next buffer frame 530 or into the next active frame 520. When a frame shifts into a discard operation, represented by circles 540, every other frame may be discarded.

The frame shifting shown in FIG. 5 may be conceptually grouped into a number of different stages, labeled as stages $S_{pre}$, $S_0$, $S_1$, $S_2$, $S_3$, $S_4$, and $S_5$ in FIG. 5. Each discard operation 540 may start a new stage. Because there is one discard operation, the update interval between each successive active frame 520-4 through 520-9 in each stage $S_0$ through $S_5$ may double. In alternative implementations, other discard patterns or combinations of discard operations are possible to achieve different discard ratios which, in turn, can be used to tailor update intervals of the displayed frames 520-1 through 520-9. The particular values shown for FIG. 5, such as the delay interval, update interval, and the number of active frames 520, represent one combination of parameter values that may be used to implement a rewind operation. Other choices for such values could alternatively be used.

Figure 6:
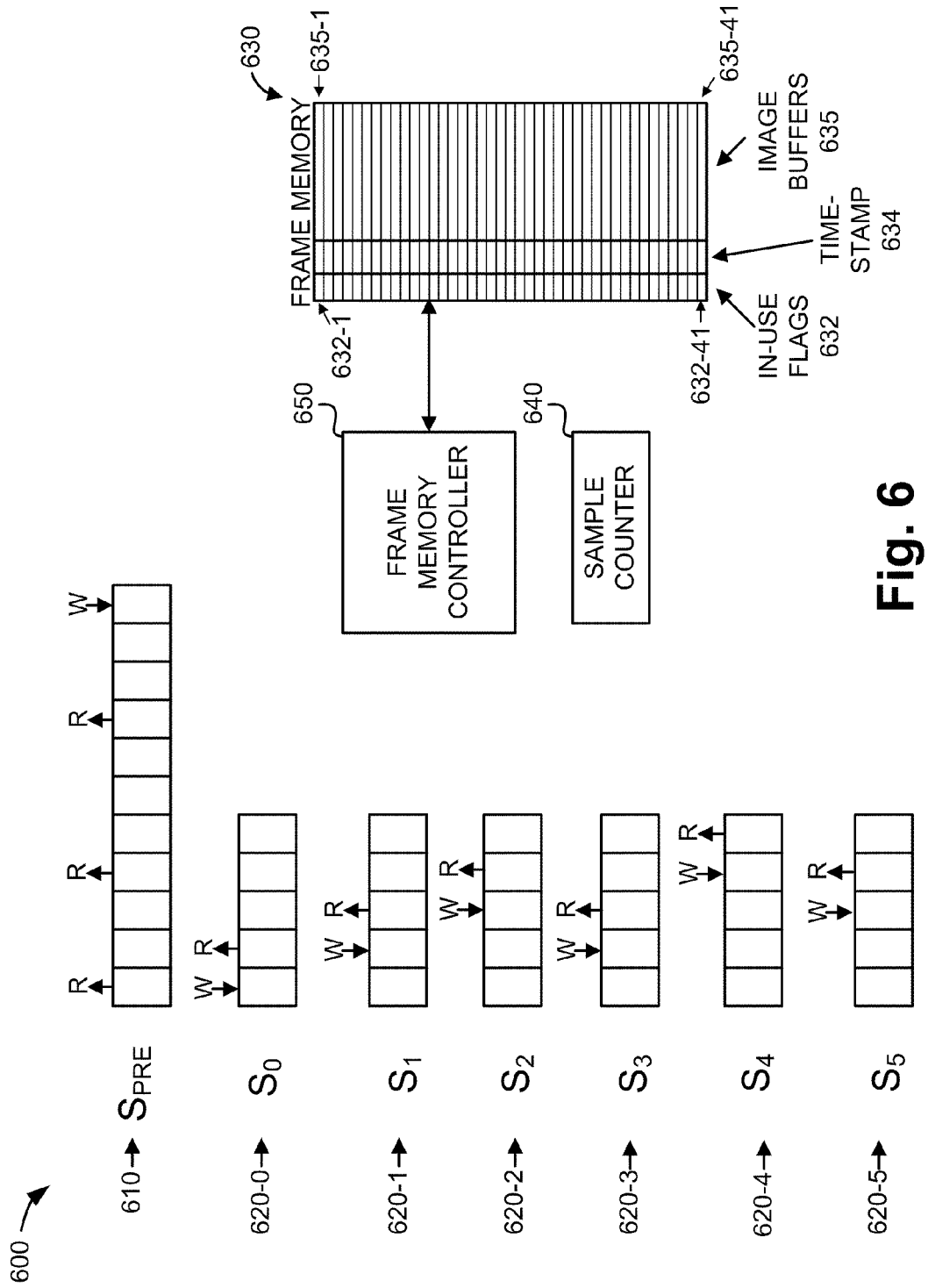
FIG. 6 is a diagram illustrating an example of a system for implementing a portion of the process shown in FIG. 4.

The frame shifting shown in FIG. 5 may represent a conceptual implementation for sampling and displaying frames, as performed in blocks 420 and 430 of process 400, to implement the rewind operation described herein. One possible implementation for physically implementing such a process will now be described with reference to FIGS. 6-9. The physical implementation of FIGS. 6-9 generally uses a shifting technique in which only pointers to the sampled images are shifted instead of shifting the actual frame images. FIG. 6 is a diagram illustrating an example of a system 600 for implementing blocks 420 and 430 of process 400. System 600 may be implemented by or be included within, for example, control unit 210 of DVR 140. System 600 may particularly include the frame shifting shown in FIG. 5. System 600 may include a plurality of circular first-in-first-out (FIFO) queues 610 and 620-0 through 620-5, a frame memory 630, a sample counter 640, and a frame memory controller 650.

Circular queue 610 may correspond to stage $S_{pre}$ in FIG. 5 and may include eleven memory slots, one for each of active frames 520 and buffer frames 530 in stage $S_{pre}$. Each memory slot may store an address of an entry in frame memory 630. Circular queues 620-0 through 620-5 may similarly correspond to stages $S_0$ through $S_5$, respectively. Each of circular queues 620-0 through 620-5 may include five memory slots, one for each of the active frames 520 and buffer frames 530 in each of stages $S_0$ through $S_5$.

Circular queues 610 and 620 may each be associated with one or more read locations R and a write location W. Read location R may point to the next memory slot that is to be read from the circular queue (i.e., the output of the circular queue). Write location W may point to the next memory slot that is to be used to write to the circular queue (i.e., the input location of the queue). After each read or write to a circular queue, the read or write location may be incremented. If an incremented read or write location indicates a location beyond an end of the queue, the read/write location may be reset to point to the beginning of the queue, to thus make the queue circular.

Circular queue 610 may be particularly associated with three read locations R, one for each of active frames 520-1, 520-2, and 520-3. The write location W of circular queue 610 may correspond to a newly sampled frame being input to active frame 520-0. Circular queues 620-0 through 620-5 may each be associated with one read location R and one write location W. The write location W of each of circular queues 620 may correspond to a frame being input to the circular queue from the circular queue corresponding to the previous stage and the read location of each of circular queues 620 may correspond to a frame being output from the stage corresponding to the circular queue. Circular queue 610, which implements stage $S_{pre}$, may support multiple read locations R because the sampling interval is constant for the frames corresponding to the read location R in circular queue 610.

Frame memory 630 may store the rewind image corresponding to each sampled frame. In the example of system 600, frame memory 630 may include 41 image buffers 635-1 through 635-41. Each image buffer 635-1 through 635-41 may be associated with an "in-use" flag 632-1 through 632-41, respectively. Each in-use flag 632 may be, for example, a bit value that indicates whether the particular image buffer 635 is currently being used to store a sampled frame (it is in-use) or is currently empty and therefore available to store a frame. Each image buffer 635-1 through 635-41 may also be associated with a corresponding timestamp field 634. The timestamp field 534 for an image buffer 635 may store the location into the program at which the image in corresponding image buffer 635 was sampled. When a user selects a rewind frame 335, the corresponding timestamp field 534 may be used to efficiently seek the video playback location to the desired location.

The memory slots in circular queues 610 and 620 may point to one of image buffers 635. In this manner, frames, when sampled, may be stored in frame memory 630. As the sampled frame logically shifts through the conceptual system shown in FIG. 5, the entire frame does not need to be shifted. Instead, only the pointer to the frame, stored in circular queues 610 and 620, may need to be read and written.

Sample counter 640 may store a count of the number of times frames have been sampled from the video program. Sample counter 640 may be incremented based on, for example, a signal from frame memory controller 650.

Frame memory controller 650 may control the updating of circular buffers 610 and 620, frame memory 630, and sample counter 640. Additional details relating to the operation of frame memory controller 650 are given below in the flow charts of FIGS. 7 and 8.

Although FIG. 6 illustrates an example of a system 600, in other implementations, system 600 may include fewer, additional, different and/or differently arranged components than those depicted in FIG. 6. Alternatively, or additionally, one or more components of system 600 may perform one or more other tasks described as being performed by one or more other components of system 600.

Figure 7:
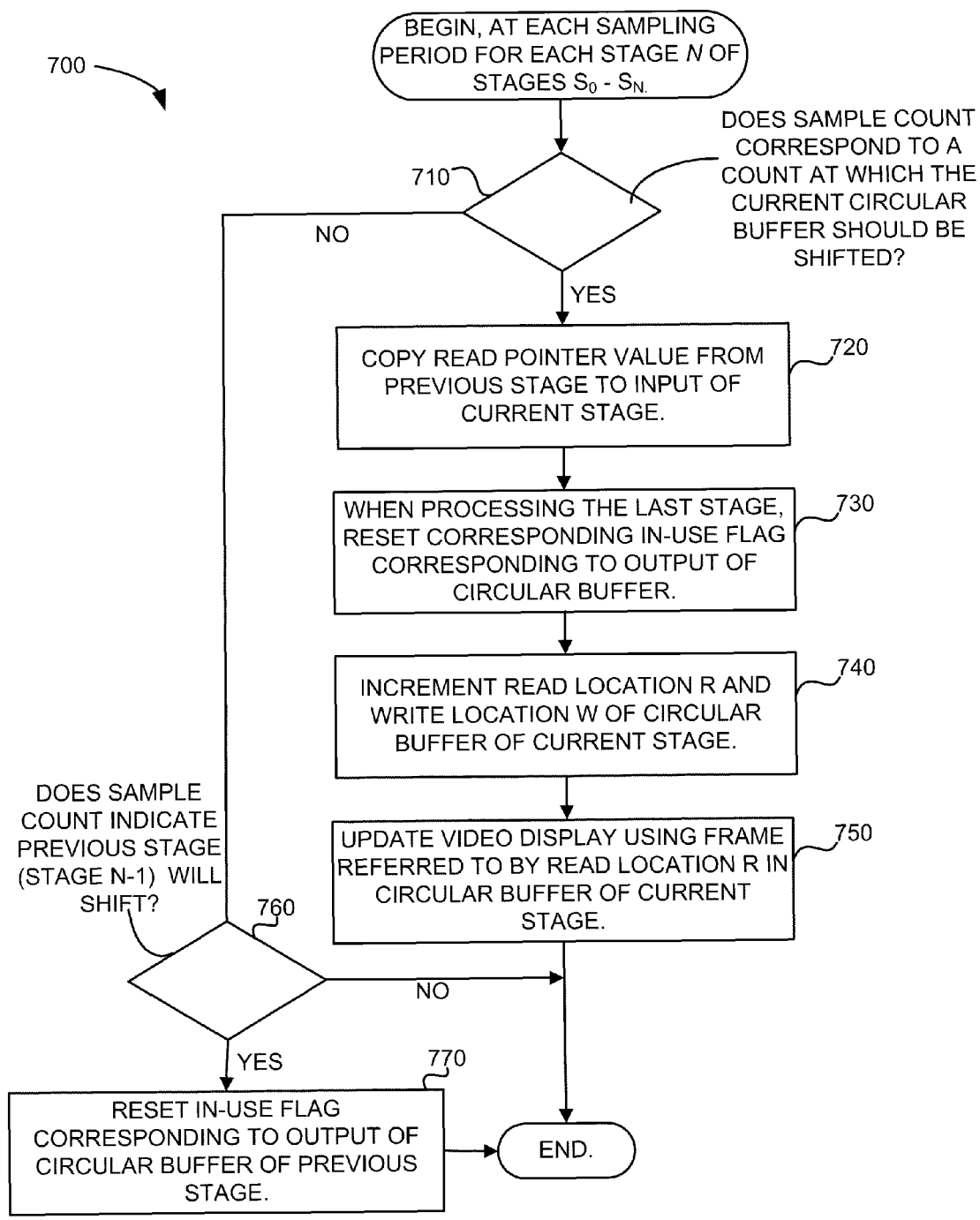
FIGS. 7 and 8 are flow charts illustrating an example process for controlling the system shown in FIG. 6.

FIG. 7 is a flow chart illustrating an example process 700 for controlling system 600. Process 700 may be performed at every frame sampling period (e.g., every three seconds). At every sampling period, process 700 may be performed for each of stages $S_n$, in descending order. In other words, for the given example in which there are six stages, $S_0$ through $S_5$, process 700 may be performed for stage $S_5$ (circular buffer 620-5), followed by stage $S_4$ (circular buffer 620-4), etc., down to stage $S_0$ (circular buffer 620-0). Processing for stage $S_{PRE}$ may be performed according to process 800, described below with reference to FIG. 8.

Process 700 may include determining if the sample count corresponds to a count at which the circular buffer, corresponding to the current stage, should be shifted (block 710). In general, this may correspond to whether a frame from the previous stage is to be read out from the previous stage and not discarded. In one implementation, block 710 may be implemented by determining if the sample count modulo $2^{n+1}$ is equal to zero. For example, if stage n=1 is being processed ($S_1$), then $2^{n+1}$ is equal to four, and therefore, every fourth sample circular buffer 620-1 would be shifted.

When the $n^{th}$ circular buffer is to be shifted, (block 710—YES), the last memory frame pointer in stage n−1 may be copied to the input of the current ($n^{th}$) stage (block 720). In other words, the value (i.e., the pointer to a frame buffer 635) in the read location R of the n−1 stage may be copied into the write location W of the $n^{th}$ stage. Accordingly, a new value is input to the circular buffer corresponding to the $n^{th}$ stage.

Process 700 may further include, when n indicates that this is the last stage (e.g., when n=5 in the example given), resetting the corresponding in-use flag 632 of the frame buffer 635 that is pointed-to by the read location R of the corresponding circular buffer (e.g., circular buffer 620-5) (block 730). This operation may essentially drop the last sampled frame from the last circular buffer, marking the frame buffer location as being available to accept more recent images (such as new samples at 520-0).

Process 700 may further include incrementing the read location R and write location W of the circular buffer for stage n (i.e., circular buffer 620-n) (block 740). Incrementing the read location R and write location W may include testing for whether the read location R or write location W are incremented beyond the limits of the circular buffer. In this case, the read location R or write location W may be reset to the first position in the circular buffer.

The frame referred to by the read location R of the $n^{th}$ stage may be output to the appropriate one of rewind frames 335 (block 750). For example, video display device 150 may be updated to include a new rewind frame 335, which may correspond to outputting for display one of the displayed frames, such as frame 520-3.

When the sample count corresponds to a count at which the $n^{th}$ circular buffer is not shifted, (block 710—NO), process 700 may further include determining whether the sample count corresponds to a count at which the previous stage will shift (block 760). In one implementation, block 650 may be implemented by determining whether the sample count modulo $2^{n+1}$ is equal to $2^n$. For example, if stage n=1 is being processed ($S_1$), then $2^{n+1}$ is equal to four and $2^n$ is equal to two. In this case, the previous stage will shift (and the current stage will not shift) whenever the sample count divided by four has a remainder of two.

When the result of block 760 is YES, this may indicate that the image buffer at the output of the previous circular queue will shift off the end of the queue and should be discarded. To implement the discarding of the image buffer, in-use flag 632 of the image buffer pointed-to by the read location R of the previous circular buffer, circular buffer 620-(n−1), may be reset to indicate that that image buffer is no longer in use (block 770). Resetting in-use flag 632 effectively performs the discard operation represented by circles 540 in FIG. 5.

Figure 8:
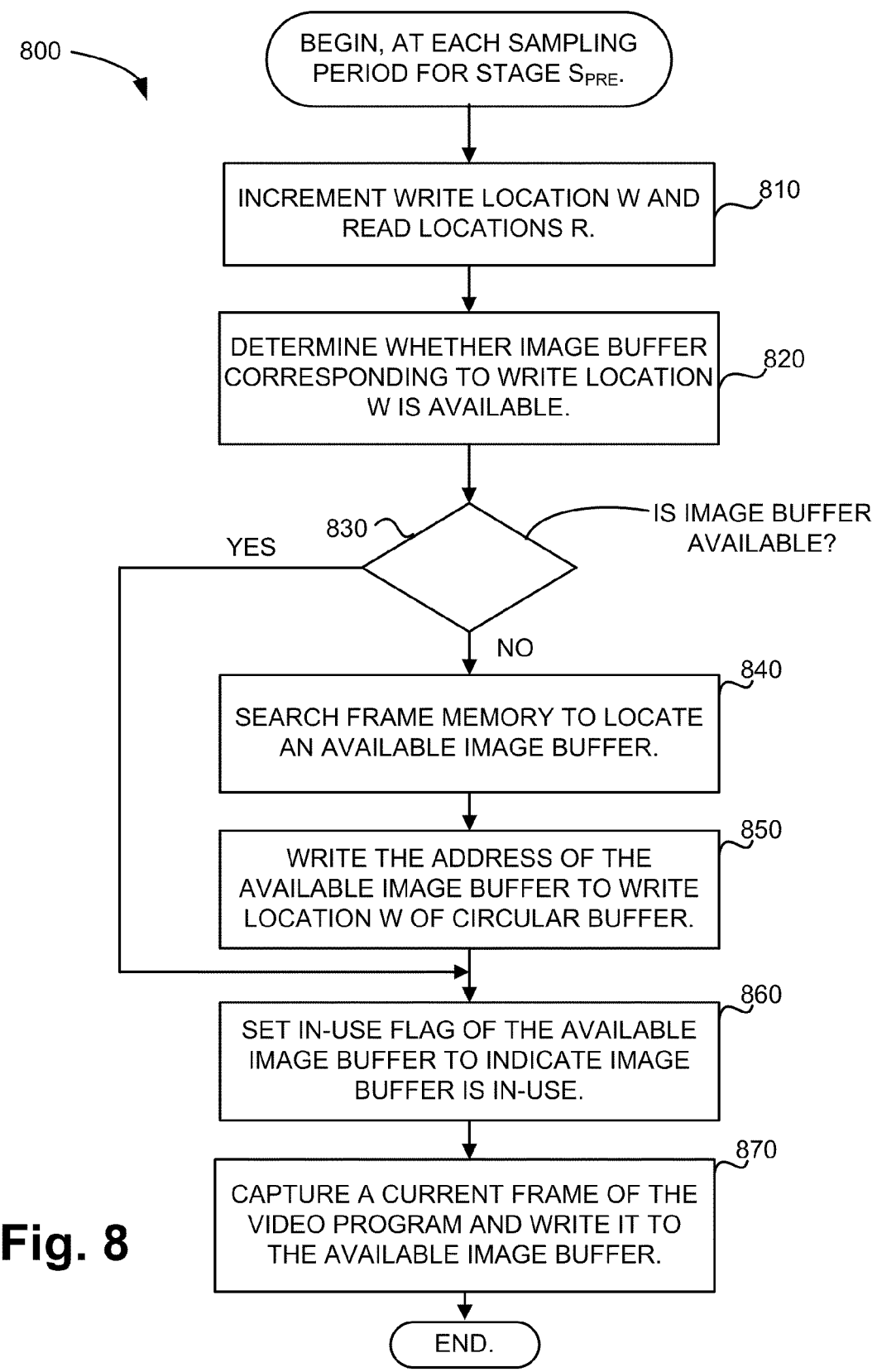

FIG. 8 is a flow chart illustrating an example process 800 for controlling system 600. Process 800 may be performed at every frame sampling period (e.g., every three seconds). At every sampling period, process 800 may be performed for stage $S_{pre}$.

Process 800 may include incrementing the write location W and all of the read locations R (block 810). Incrementing the read locations R and write location W may include testing for whether the read locations R and write location W are incremented beyond the circular buffer. In this case, the overflowing read location R or write location W may be reset to the first position in the circular buffer.

Process 800 may further include determining whether the corresponding in-use flag of the frame image buffer 635 corresponding to the write location W indicates that the image buffer is available (block 820). This may be the case after initialization or after the frame buffer has been "released" by one of the discard actions by subsequent stages (see block 770). When the image frame pointed-to by write location W is not available, (block 830—NO), frame memory 630 may be searched to locate an available image buffer (block 840). An available image buffer 635 may be one in which the corresponding in-use flag 632 is set to false. The address of the available image buffer in frame memory 630 may be written to the write location W in circular buffer 610 (block 850).

When the image frame pointed to by write location W is available, (block 830—YES) or after block 850, process 800 may further include setting the in-use flag of the image buffer pointed to by write location W to indicate that the image buffer is in-use (block 860). At this point, the image buffer pointed to by write location W may be free to receive a new image. Process 800 may further include capturing a current frame of the video program and writing it to the image buffer pointed to by write location W (block 870). In FIG. 5, the captured image may correspond to the image of currently active frame 520-0.

Figure 9:
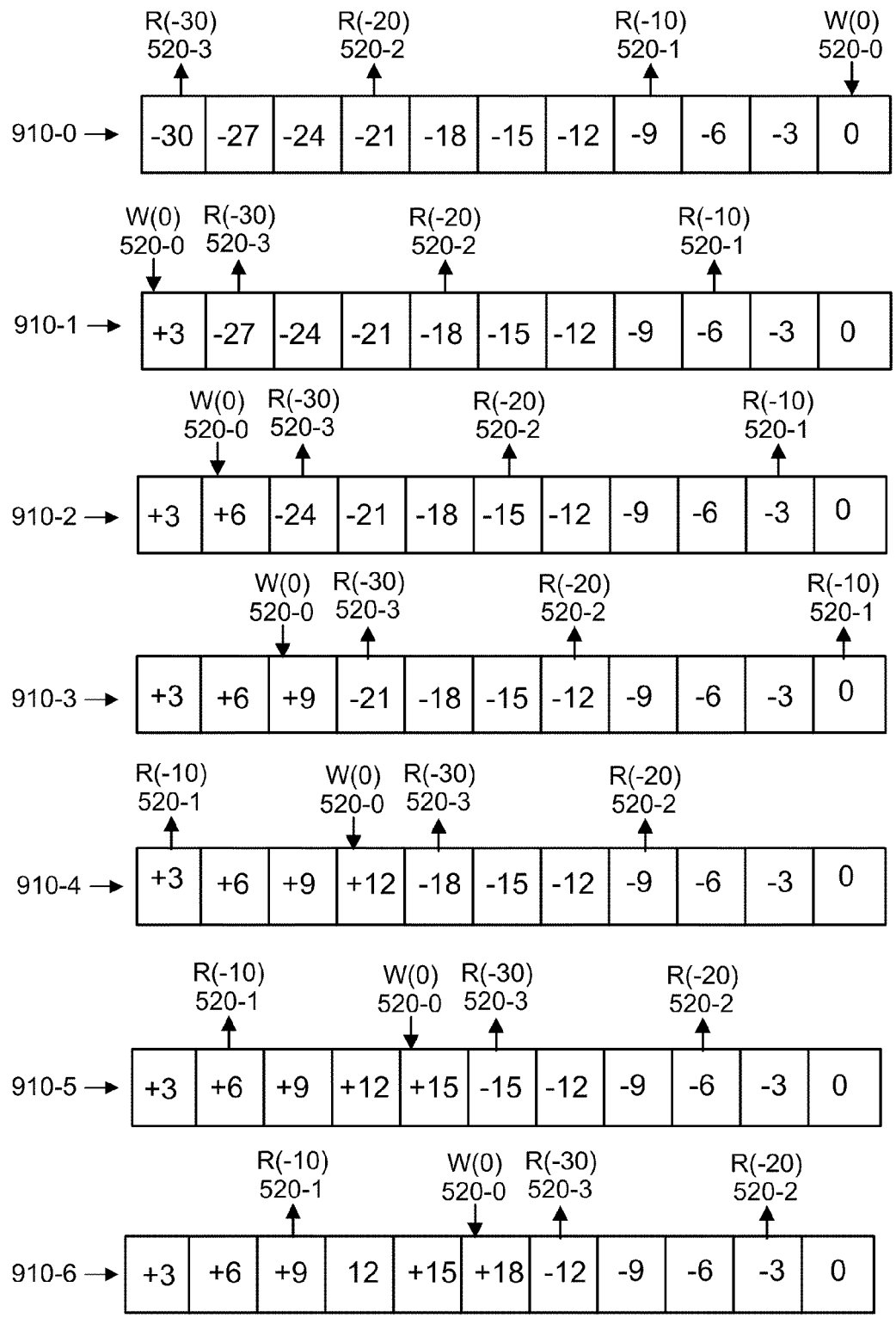
FIG. 9 is a diagram illustrating an example series of states for a circular buffer.

FIG. 9 is a diagram illustrating an example series of states 910 for circular buffer 610 (which implements stage $S_{PRE}$). Each state 910-0 through 910-6 may illustrate the contents of the memory slots for circular buffer 600 and the location of the read locations R and write location W for circular buffer 610.

Successive states 910-0 through 910-6 may be obtained after sampling a new frame of the video program and performing the operations illustrated in FIGS. 7 and 8. The values in each memory slot of circular buffer 610 represent a frame sampled at the indicated offset from an initial sampling time, time zero. For instance, the memory slot equal to −3 indicates that this memory slot stores a reference to a frame three seconds prior to time zero and memory slot −30 indicates that this memory slot stores a reference to a frame 30 seconds prior to time zero. Similarly, the memory slot equal to +3 indicates that this memory slot stores a reference to a frame three seconds after (i.e., in the future relative to) time zero. The size and sampling period (3 seconds) of circular buffer 610 correspond to the example implementation illustrated in FIGS. 3, 5, and 6.

In FIG. 9, at state 910-0, write location W of circular buffer 610 may refer to one of image buffers 635 that includes the currently sampled image (delay zero), which corresponds to the image of active frame 520-0. Similarly, one of read locations R (R(−10), which corresponds to active frame 520-1), may refer to one of image buffers 635 that includes an image sampled 9 seconds ago (delay −9); another one of read locations R (R(−20), which corresponds to the image of active frame 520-2), may refer to one of image buffers 635 that includes an image sampled 21 seconds ago (delay −21); and another one of read locations R (R(−30), which corresponds to the image of active frame 520-3), may refer to one of image buffers 635 that includes an image sampled 30 seconds ago (delay −30).

States 910-0 through 910-6 may represent sequential states of circular buffer 610 after performing processes 700 and 800. The positions of read location R and write location W, and the contents of the memory slots, may change for circular buffer 610, as shown in states 910-0 through 910-6.

In the description of the implementation of a non-linear rewind operation described with respect to FIGS. 5-9, the non-linear rewind was implemented by buffering an incoming video stream. Other techniques for implementing a non-linear rewind operation may also be used. For example, instead of buffering the video content at a receiving device, the broadcast video content may explicitly include data that defines rewind frames 335. In this implementation, the rewind frames may be generated by the broadcaster, potentially saving processing and/or memory resources of the receiving device, such as DVR 140.

Figure 10:
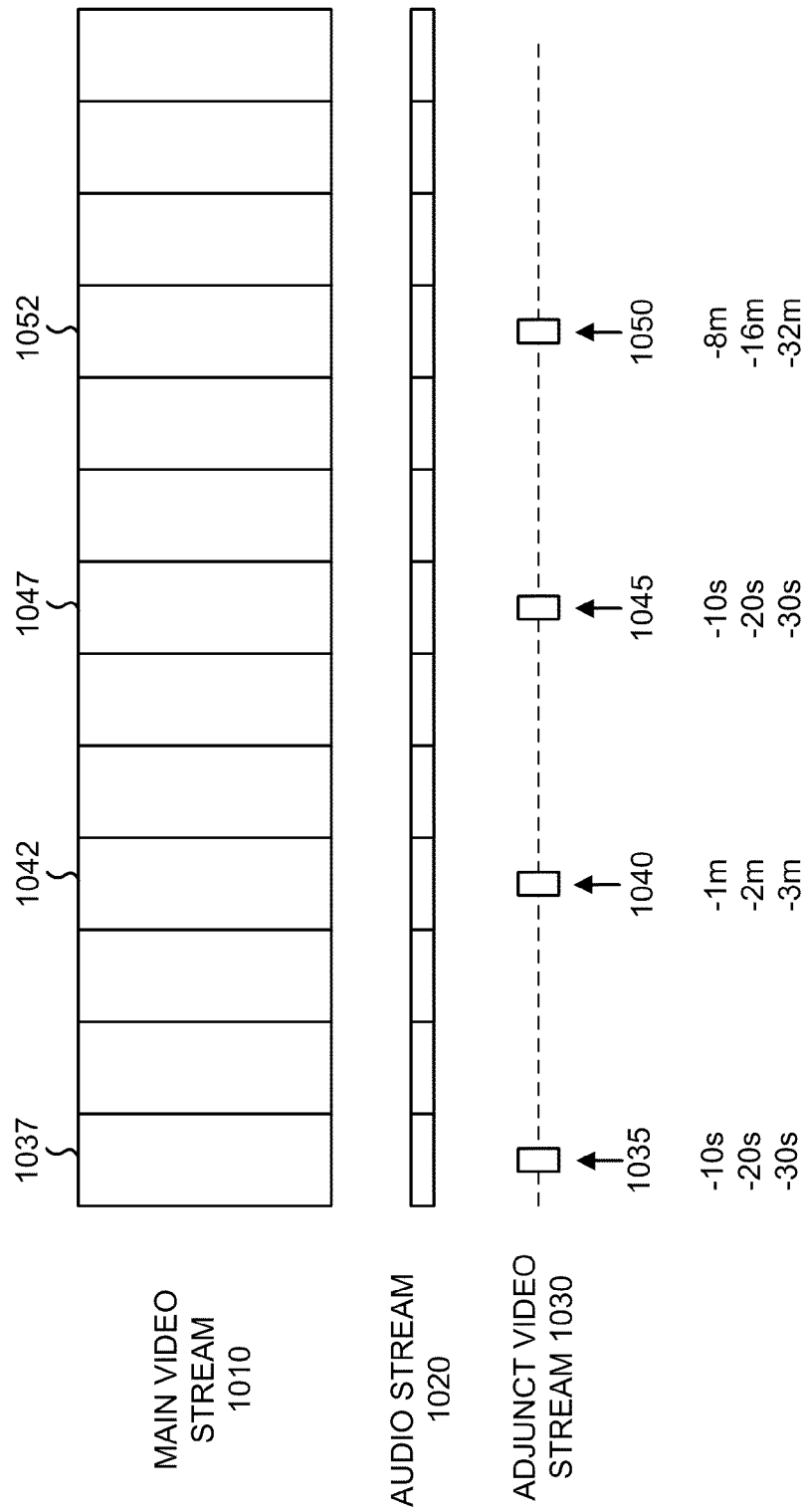
FIG. 10 is a diagram conceptually illustrating an example of an alternative implementation of a non-linear rewind operation.

FIG. 10 is a diagram conceptually illustrating an example of an alternative implementation of a non-linear rewind operation.

In FIG. 10, main video stream 1010 may represent the video frames for a video program being broadcast by, for example, a cable or over-the-air broadcaster. Audio stream 1020 may represent the audio portion of the video program. Main video stream 1010 and audio stream 1020 may be received by DVR 140 and presented on video display device 150.

Main video stream 1010 may also be associated with an "adjunct" video stream 1030. Adjunct video stream 1030 may be a separate video stream that includes rewind frames 335 that are presented in the rewind operation. Alternatively, adjunct video stream 1030 could be interleaved or otherwise included in main video stream 1010. The rewind frames 335 transmitted with adjunct video stream 1030 may generally be reduced in size and delayed versions of the frames in main video stream 1010.

Adjunct video stream 1030 may be a "bursty" video stream in which rewind frames are broadcast in bursts, illustrated as bursts 1035, 1040, 1045, and 1050. In burst 1035, for instance, three rewind frames may be included, corresponding to a rewind frame from ten seconds earlier than the current frame of video stream 1010 (−10 s), a rewind frame from 20 seconds earlier than the current frame of video stream 1010 (−20 s), and a rewind frame from 30 seconds earlier than the current frame of video stream 1010 (−30 s). For burst 1035, the "current frame" may correspond to video frame 1037. Similarly, in burst 1040, three frames 335 may be included, corresponding to a rewind frame from 1 minute earlier than the current frame of video stream 1010 (−1 m), a rewind frame from 2 minutes earlier than the current frame of video stream 1010 (−2 m), and a rewind frame from 3 minutes earlier than the current frame of video stream 1010 (−3 m). For burst 1040, the current frame may correspond to video frame 1042. Additional bursts 1045 and 1050 are also illustrated in FIG. 10, where the rewind frames in burst 1045 (−10 s, −20 s, and −30 s) correspond to current frame 1047 and the rewind frames in burst 1050 (−8 m, −16 m, and −32 m) correspond to current frame 1052.

As illustrated for adjunct video stream 1030, rewind frames may be transmitted intermittently relative to main video stream 1010. For example, a burst of rewind frames may be transmitted after a predetermined number of frames or seconds elapsed since the previous burst. Although bursts in FIG. 10 are illustrated as being transmitted every third frame in main video stream 1010, in practice, the bursts could be more widely dispersed, such as a burst transmitted every one or ten seconds. Alternatively, adjunct video stream 1030 may be sent using a different program identifier (ID) within the same multi-program transport stream as video stream 1010.

Additionally, rewind frames that have smaller delays, such as the rewind frames that are delayed 10 s, 20 s, and 30 s, may be transmitted more frequently than rewind frames that have a larger delay (such as the rewind frames delayed 1 m, 2 m, and 3 m). This may be beneficial because rewind frames that are relatively recent may be more time sensitive, from the viewers' perspective, than older rewind frames. As an example of this, consider the situation in which a rewind frame is received two seconds later than the scheduled time to display the rewind frame. For the rewind frame that corresponds to the frames that is 10 seconds behind the current position, two seconds may be noticeably lagged relative to what should be shown to the user. However, for the rewind frame that corresponds to the frames that is 32 minutes behind the current position, a two second lag in updating its appearance will be inconsequential.

Adjunct video stream 1030 may require significantly less bandwidth than main video stream 1010. Less bandwidth may be required because each rewind frame may be significantly reduced in size relative to the original video frame. For example, in the situation in which each rewind frame is reduced to ten percent of the original height and width of the video frame, the space required to store the rewind frame may be approximately one percent of the space required to store the original frame. Additionally, because the rewind frames need not be broadcast with every frame in main video stream 1010, the bandwidth of adjunct video stream 1030 may be further reduced.

One benefit of using an adjunct video stream, as illustrated in FIG. 10, is that when a user switches to a new video program, the entire series of rewind frames can be quickly obtained. In contrast, if the series of rewind frames are obtained only by buffering at DVR 140, the rewind frame corresponding to 32 minutes ago may not be obtainable until the user has viewed the video program for 32 minutes.

The foregoing description provides illustration and description, but is not intended to be exhaustive or to limit the invention to the precise form disclosed. Modifications and variations are possible in light of the above teachings or may be acquired from practice of the invention without undue experimentation.

While a series of blocks has been described with regard to FIGS. 4, 7 and 8, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions.

A component, as used herein, may include hardware, such as a processor, an application-specific integrated circuit (ASIC), or a field-programmable gate array (FPGA), or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
outputting, by the computing device, a video program;
obtaining, by the computing device, sampled images corresponding to select frames of the video program;
outputting, by the computing device, a series of the sampled images in an order in which a sampling time corresponding to each of the sampled images in the video program monotonically increases or decreases in the output series, where differences in the sample times between successive images in the series of sampled images are non-uniform;
receiving, by the computing device, a selection of one of the images in the output series of sampled images;
changing, by the computing device, a current output location of the video program to a location corresponding to the sampling time of the selected image;
writing pointers to the sampled images to a plurality of circular buffers; and
discarding alternating outputs of the plurality of circular buffers.

2. The method of claim 1, further comprising:
receiving the video program as a broadcast television program; and
recording the received video program.

3. The method of claim 1, where outputting the series of sampled images, receiving the selection of the images, and changing the output location of the video program is performed in response to a request from a user to implement a rewind or fast-forward operation for the video program.

4. The method of claim 1, where the output series of sampled images are overlaid on the output video program.

5. The method of claim 1, further comprising:
saving the sampled images as a reduced size version of corresponding frames in the video program.

6. The method of claim 1, further comprising:
shifting the pointers through the plurality of circular buffers based on a count of a number of the sampled images.

7. The method of claim 1, where the obtained sampled images are received as part of an adjunct video stream corresponding to a video stream of the video program.

8. A device comprising:
one or more processors;
one or more memories, coupled to the one or more processors, the one or more memories storing instructions, that when executed by the one or more processors, cause the one or more processors to:
play a video program;
obtain sampled images corresponding to select frames of the video program;
output a series of the sampled images in an order in which a sampling time corresponding to each of the sampled images in the video program monotonically changes in the output series, where differences in the sample times between successive images in the series of sampled images are non-uniform;
receive a selection of one of the images in the output series of sampled images; and
rewind a playback location of the played video program to a location corresponding to the sampling time of the selected image;
a frame memory to store the sampled images as a reduced size version of the corresponding frames in the video program;
a counter to store a sample count that describes a number of times the select frames of the video program have been sampled; and
a plurality of circular buffers, each of the plurality of circular buffers storing pointers to the sampled images in the frame memory, where the pointers are shifted through the plurality of circular buffers based on the sample count.

9. The device of claim 8, where the output series of sampled images are overlaid on the played video program.

10. The device of claim 8, where the obtained sampled images are received as part of an adjunct video stream corresponding to a video stream of the video program.

11. The device of claim 8, where the device includes a digital video recorder.

12. A device comprising:
a frame memory to store a plurality of images, each of the images corresponding to a reduced-size version of a frame sampled from a video program;
a plurality of buffers to store pointers to the images in the frame memory, each of the plurality of buffers representing a stage in a sequence that includes the images in the frame memory;
a sample counter to store a count value indicating a number of times frames have been sampled from the video program; and
a controller to, based on the count value, shift outputs of the plurality of buffers to a next stage in the sequence, where alternating outputs of at least some of the plurality of buffers are discarded instead of being shifted to the next stage and where each buffer stores at least one pointer that corresponds to an image in the frame memory that is to be displayed to a user as part of an interface for implementing a rewind or fast forward operation on the video program.

13. The device of claim 12, where the device includes a digital video recorder.

14. The device of claim 12, where the buffers include circular buffers.

15. The device of claim 12, where the images that are displayed as part of the interface for implementing the rewind or fast forward operation correspond to the sampled images in which sampling times between the displayed images are non-uniform.

16. The device of claim 12, where the interface for implementing the rewind or fast forward operation is displayed overlayed on the video program.

* * * * *